United States Patent

[11] 3,579,999

[72] Inventor Ralph E. Schwartz
 Lindenhurst, N.Y.
[21] Appl. No. 757,195
[22] Filed Aug. 8, 1968
[45] Patented May 25, 1971
[73] Assignee Redeco, Inc.
 East Islip, L. I., N.Y.

[54] METHOD AND APPARATUS FOR THE PRESERVATION OF BIOLOGICAL SUBSTANCES
8 Claims, 3 Drawing Figs.

[52] U.S. Cl. .................................................. 62/56,
 128/1, 195/1.7, 424/101
[51] Int. Cl. .................................................. A61m 1/02
[50] Field of Search .......................................... 195/1.7
 (X); 128/1 (X); 424/101 (X); 100/38; 99/21 (X),
 150 (X); 62/56, 306, 66

[56] References Cited
 UNITED STATES PATENTS
 653,956 7/1900 Hamilton ..................... 99/21
 2,327,041 8/1943 Hill et al. ..................... 62/56X
 2,662,520 12/1953 McMahon ..................... 62/75X
 3,406,531 10/1968 Swenson et al. ............... 62/306

Primary Examiner—William E. Wayner
Attorney—Hopgood and Calimafde

ABSTRACT: Biological substances such as blood are stored under pressure at below 0° C. temperatures, in a substantially nondilatable vessel. Upon being introduced into the vessel, the temperature of the vessel and the blood are reduced to 4° C.; when equilibrium has been achieved the blood within the vessel is precompressed at a controlled rate several thousand pounds per square inch by the application of mechanical leverage to a vessel piston. Thereafter, the vessel and blood are reduced to a final temperature from 0° C. to −21° C. This temperature reduction, because of the conjunctive effect of the volumetric expansion of the blood and nondilation of the vessel, self-generates a pressure from 15 to 35,000 p.s.i. The vessel may now be stored at the final temperature and the blood within it maintained without deleterious effects.

PATENTED MAY 25 1971 3,579,999

INVENTOR.
RALPH E. SCHWARTZ

BY
Hopgood & Calimafde
ATTORNEYS

METHOD AND APPARATUS FOR THE PRESERVATION OF BIOLOGICAL SUBSTANCES

BACKGROUND OF THE INVENTION, GENERAL FIELD

This invention relates to the preservation of biological substances and, in particular, to the preservation of whole blood.

The preservation of biological substances such as vaccines, sera, enzymes, hormones, blood, bacteriological cultures of various forms, and specimens of tissue (including foodstuffs), bone, and the like, have represented an especially acute problem within the past several decades. The relatively short shelf life of such substances, coupled with their high demand, have driven their costs to impractical levels.

With respect to blood in particular, complex systems have been inaugurated which, because of the short duration of preservation and high cost, have necessitated detailed arrangements of debits and credits through blood "banks."

For the purposes of illustration, the background and inventive descriptions will be hereinafter directed to whole blood. It will be appreciated, however, by those skilled in the art of preservation of biological substances, that the invention applies with like import to biological species other than blood with naturally some changes in the pressure temperature parameters to be disclosed.

In dealing with blood, the primary constituent consideration is the erythrocytes or red cells. The red cell is globular in form and contains a cytoplasm in a semipermeable membrance. This membrane girds the enclosed free fluid within the cell and, although details of the intimate structure of the erythrocyte membrane are unknown, complex mixtures of fibrous protein, lipid, and mucopolysaccharides are known to exist. The membrane is ductile, but is essentially nonelastic and has a critical maximum volume beyond which rupture occurs. Rupture of the membrane results in the release of hemoglobin into the blood plasma where it cannot serve its primary function of carrying oxygen and carbon dioxide. This latter or exchange function takes place through the permeable membrane.

As the erythrocyte ages in vivo (in the circulatory system) its composition changes. Generally, enzyme activities are higher in younger cells and decrease as the cell ages. Normally, the red blood cells in vivo have a life span of approximately 120 days, after which body organs selectively eliminate the cells by breaking them down into waste and recirculating certain waste elements for the production of new cells in the bone marrow.

Studies of the osmotic properties of the red cell membrane have revealed basic information on the permeability of the membrane to certain solutes and water. Such observations have led to the conclusion that the membrane allows the passage of water, which is the primary constituent of the internal fluid, and plasma. It has been concluded that the erythrocyte membrane is impervious to sucrose and electrolyte, and that water movements across the membrane lead to the establishment of osmotic equilibrium between the cells and plasma.

The movement of water and hydrophilic molecules between the cell interior and the surrounding media through the membrane conceivably proceeds either by dissolution of the molecules in the membrane phase and diffusion from one side of the membrane to the other, or by diffusion or convection through channels or pores which connect extra and intracellular fluid.

While knowledge of the precise nature of movement is not necessary for an understanding of the invention, the fact that physical displacement does take place through the membrane does establish inertial considerations and the requirement that quick or violent changes be avoided lest membrane rupture occur.

As previously mentioned, in the circulatory system of the body the red cells have a life span of approximately 120 days. However, in the in vitro state, the red blood cells deteriorate very rapidly. In considering the factors influencing the preservation of the red cells for purposes of replacement therapy, of extreme import is the maintenance of its chief function, gas transport through the erythrocyte membrane for the carrying of oxygen from the lungs to the body cells and the return of the red cells with the carbon dioxide.

In order to ensure maintenance of this function (cell viability), several considerations have become paramount: (1) to avoid the tendency of the blood, while in the in vitro state, to achieve the phenomena of clotting; (2) to slow down the metabolic processes; and (3) the maintenance of cell integrity (this partially overlaps area 2).

With respect to area (2) supra, it is known that the exchange of gases through the cell is probably due to concentration gradients and does not require energy expenditure. Further, the cell appears to synthesize little protein or lipid after it matures, and its hemoglobin is already completely formed. The circulating cell must, however, maintain its shape, its internal ionic composition, and its structural integrity. It must also keep its hemoglobin in its produced form. All of these tasks require energy and, hence, the viable erythrocyte must produce energy. In the in vitro state this energy production results in the red cell carrying on a metabolic process until the blood sugar is depleted and is converted to lactic acid. This results in lowering of the PH of the plasma to an unsatisfactory level and the osmotic balance between the intra and extra cellular material is soon destroyed.

With respect to cell integrity, consideration area (3) above, cell viability is reflected by cell hemolysis tests and osmotic fragility. Hemolysis is the destroying of the integrity of the cell membrane while osmotic fragility is the stressing of the cell to a degree where it will be removed by either the spleen or the liver. All loss is directly measurable by what is known as a hematacrit, a device which centrifuges the blood and gives the ratio of plasma to cells.

BACKGROUND OF INVENTION, CONVENTIONAL TECHNIQUES

Indirect transfusion (transfusion other than directly from donor to donee) became possible with the introduction of a citrate solution as an anticoagulant. Modification of this citrate solution by acidification and the addition of glucose (acid-citrate-dextrose), yielded ACD, which as an additive in the ratio of approximately 15 grams per 100 grams of blood provided a solution, which under adequate refrigeration (approximately 4° C.), was safe for transfusion for a period of approximately 21 days. The temperature of 4° C. was selected as above freezing yet sufficiently low so that the blood solution could be maintained in the liquid phase with a substantially reduced metabolic rate.

Aside from the modification of the citric solution, as aforementioned (and a still newer anticoagulant CPD which will be discussed) and the concept of reduced-temperature liquid phase storage, very little progress has been made in recent years in improving the maintenance of the viability of red cells during storage.

While there are very real practical objectives for prolonging the safe storage period of red cells in the best possible functional state, and these include the conservation of an inventory of rare blood types and the elimination of wastage through outdating (presently blood is discarded at 21 days of age), no process other than that described above has proven adaptable to convenient and economical stock piling of human blood in unit amounts (approximately 500 ml.).

The successful revival of fish trapped in ice for extended periods has produced, over the years, a great concentration of effort directed to solid phase (frozen) storage. However, unprotected blood, when cooled to temperatures below freezing, show massive red cell damage.

Three theories have been advanced to explain the damage: (1) that the extracellular ice crystals exert a physical grinding action on the cells; (2) that the water crystallization occurs in a pure state leaving behind local concentrations of salt causing a combined protein denaturing effect and intracellular hypertonicity; and (3) a disruption of spatial relationships within the cell.

These theories in turn have each generated methods for the lowering of temperatures below the freezing point without cell damage. One method suggests the replacement of the free intracellular material by an additive such as glycerol or dimethyl sulfoxide which penetrates the cells. While such an arrangement protects the red cells from damage during ice crystallization, the chemicals themselves must be removed before the blood can be transfused. Accordingly, such processes, as well as the apparatus for effectuating them, have been proved to be extremely expensive.

Alternative arrangements suggest rapid freezing in the presence of nonpenetrating or slowly penetrating additives such as PVP (polyvinylpyrrolidone) dextrin, gelatin, sucrose, lactose or glucose. These additives, however, raise the same problems as those just discussed.

More sophisticated and esoteric arrangements involving the droplet freezing of blood in moving streams of liquid nitrogen and the aqueous bathing of the droplets in specific solutions have also been suggested, however, all of these more sophisticated arrangements are completely beyond the pale of competence of the normal hospital technician, and, consequently, are undependable and unreliable. Further, they introduce almost insurmountable sterility problems.

The use of high pressures to avoid freezing has been generally rejected due to the alleged cytotoxic effect of the pressure itself on the red cells and due to "shell" freezing (to be described) which inevitably takes place destroying an inordinate number of red cells.

It is the object of this invention to provide a method for the storage of biological substances for extended periods of time, including months and years, which at the end of such periods, exhibit the same or better cell viability (where the biological material was living) and characteristics as those observed after short periods of conventional storage.

It is another object of this invention to provide a method as previously described, which is particularly applicable to the storage of whole blood and which maintains the highest percentage of the erythrocyte viability for the storage period.

It is a further object of this invention to provide a method for the storage of whole blood in unit volumes which is adaptable to conventional sterilization techniques.

It is another object of this invention to provide a method and apparatus for the storage of whole blood which is relatively simple to implement and use, which may be accomplished with personnel of minimal training.

It is a still further object of this invention to provide an apparatus for the storage of whole blood which is particularly adaptable to blood units.

It is a still further object of this invention to provide an apparatus for the storage of whole blood which accomplishes the foregoing objects in a manner which is self-generative and which, once the process is under way, automatically achieves the desired optimum condition.

SUMMARY OF THE INVENTION

Briefly, the invention is predicated upon the careful control of temperature and pressure in such a manner as to maintain characteristics of the biological substance by the avoidance of freezing shocks as well as the phenomena of freezing itself. With blood this permits the maintenance of the integrity of the erythrocyte and its membrane, while lowering its metabolic rate sufficiently to obviate deterioration. It has been discovered, for example, that by precompressing whole blood at a temperature above freezing, and carefully controlling the pressure to ensure minimal shell-freezing shocks as the temperature is lowered, it is possible to lower the temperature to a point where the metabolic rate is negligible, without deleterious effects.

It has further been ascertained that by applying this precompression at the maximum density point of blood and then containing the blood in a nonyielding vessel, the volumetric expansion of the blood as it undergoes temperature decrease will, depending upon the precompression pressure, automatically maintain the foregoing functional requisites to a predetermined final storage temperature.

The above mentioned and other features and objects of this invention and the manner of attaining them will become more apparent and the invention itself will best be understood by reference to the following description of an embodiment of the invention taken in conjunction with the accompanying drawings wherein:

FIG. 1 graphically illustrates permissible precompression versus final storage temperature parameters in p.s.i. and degrees centigrade, respectively;

FIG. 2 is a longitudinal sectional illustration of one embodiment of a storage vessel according to the invention; and FIG. 2a is an enlarged fragmentary view of part of FIG. 2 to show a detail of piston rings in FIG. 2.

DETAILED DESCRIPTION OF THE INVENTION

Figure 1:
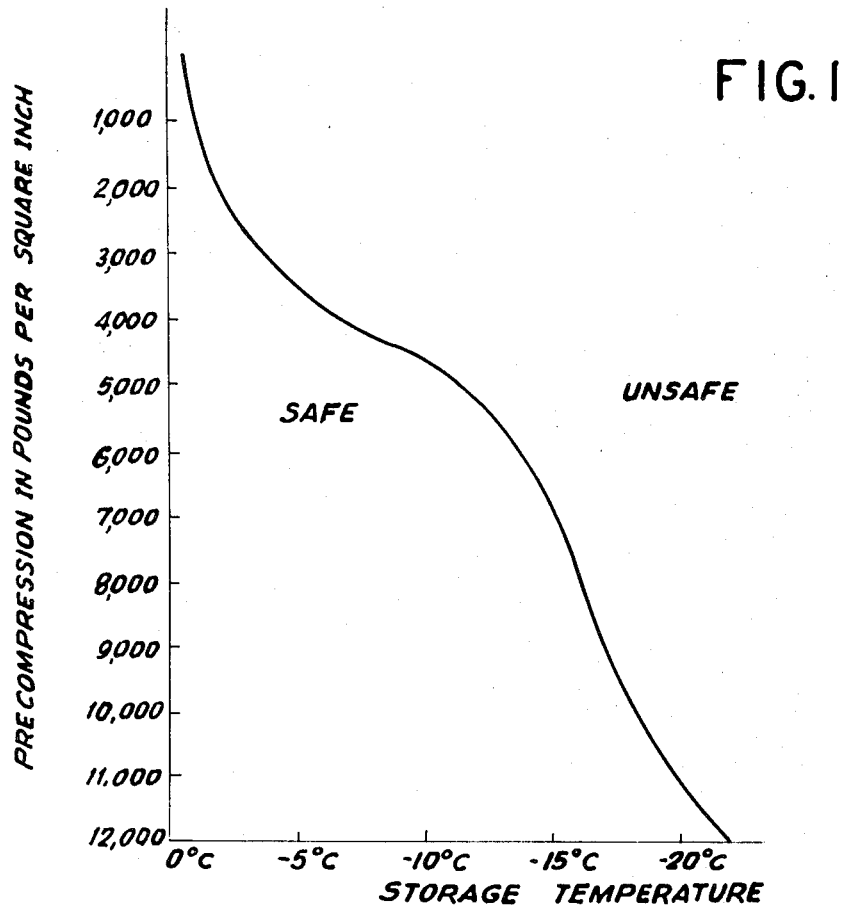

As previously discussed, the solid phase storage of frozen blood is not feasible for widespread use, and the use of high pressures to avoid crystal formation has been rejected and expressly described by authorities as impractical and cytotoxic to the red cells from the pressure itself.

There is, however, a relationship which has not been completely explored and which, while it may be only theorized, is completely supported in the laboratory. Blood is approximately 90 percent water and, consequently, its static, dynamic, and physical characteristics are such that its behavior may be anticipated by the water analogy in several important respects. For example, both water and blood achieve maximum density at 4° C. (actually 3.98° C., however, since the FIG. is not critical to the second decimal point, an approximation of 4° C. will be adhered to hereinafter). Accordingly, both above and below 4° C. water (blood) will expand.

Also analogous is the phenomenon of freezing. During freezing, an expansion of from 7 percent to 13 percent in volume occurs (depending upon freezing temperature and pressure). Because of an almost unavoidable temperature gradient between the center of the containing vessel and the outer walls, freezing necessarily takes place in laminar stages or shells, and as each stage freezes (a stage may represent only 1,000th of an inch) its volume expands from 7 percent to 13 percent. If the space is confined or the volume otherwise fixed, a pressure shudder will be transmitted throughout the fluid. Recalling the previously explained character of the erythrocyte membrane, while it is permeable and ductile, sudden changes do not permit maintenance of an equilibrium between extra and intracellular fluid. Accordingly, if shell freezing is permitted to take place, hemolysis will occur, or, if insufficient to completely destroy the integrity of the membrane, the osmotic fragility will be so low that upon being transfused the affected red cells will be removed from circulation. The free expansion of water and blood when freezing at, for example, one atmosphere and 0° C. is 9 percent, but the compressibility of water and blood at this temperature and pressure, due to the change in state, is only 4.2 percent. Thus, when the rapid expansion takes place in a controlled volume, ice would form to a total amount of expansion to cause a change of 4.2 percent of the volume beyond which no more ice could form at that temperature.

Hence, the ability of water or blood to convert to the solid stage depends upon its compressibility. I have discovered that if this compressibility can in some manner be accounted for, crystallization or freezing of a portion can be avoided. In the case of human blood, this avoids the hemolysis of the cells under the surge of pressures accompanying crystallization. Specifically, I have found that a sufficient amount of "precompression" may be applied to the blood to take up the available compressibility, thereby eliminating or controlling these surges of pressure.

As will be appreciated by those skilled in the art, the freezing point of a liquid will depend upon the prevailing temperature and pressure. Thus, at pressure $p$, the freezing point would be $t$, but at $p_2$ where $p_2 > p_1$, the freezing temperature would be at $t_2$, a lower temperature than $t_1$.

"Precompression" may be defined for the purpose of this disclosure and invention as the mechanical application of positive pressure at any temperature above the freezing point of the substance being worked upon.

Precompression may be applied in a unitary manner at one temperature (see, for example, the embodiment described herein) or it may be applied in stages with the introduction of defined pressure increases at predetermined temperature points (e.g. 5,200 p.s.i. at 4° C., 3,000 p.s.i. at −5° C., and 2,000 p.s.i. at −8° C., and so on).

As mentioned, the precompression may be applied at any temperature above freezing; however, in order to define its magnitude, the precompression pressure will be measured at maximum density; for blood this is 4° C. To determine precompression pressure the temperature need only be brought to 4° C. and the pressure increased. For example, assume that in a nonyielding vessel, 4,000 p.s.i. (absolute is to be inferred in all pressure values) pressure is applied at a temperature of 5° C. Since blood will thereafter contract to 4° C., the "precompression pressure" will be 4,000 p.s.i. minus the pressure drop due to the volumetric contraction of blood to 4° C. The same contraction principle would apply if pressure were introduced at 3° C. and the precompression pressure would be 4,000 p.s.i. minus the pressure drop due to contraction.

From observed data, it has been found that even a slight degree of pressure has a marked effect on the temperature at which the rapid expansion necessary to allow ice to form will occur.

Additional pressure after or between precompressions, I have found, can be self-generating. When water or an aqueous solution is contained in vessel having sufficiently high modulus of elasticity and yield point so as to reduce to an almost negligible amount the radial displacement of the vessel when the temperature is lowered below 4° C., a pressure is generated due to the attempt of the liquid to expand. The result is that the point of rapid expansion at which ice is formed (normally at 0° C. at one atmosphere of pressure; lower when precompressed) will be lowered until the forces acting upon the fluid and tending towards ice overcome the pressure.

It bears mentioning that while it is theoretically desirable (from the point of view solely of freezing) to put sufficient precompression on the blood to account for all compressibility, this requires a pressure of about 12,000 p.s.i. applied at about 4° C. Tests have shown, however, that this much pressure applied at one time induces undesirable cell wall deformation so that body rejection upon transfusion may be presumed. This can be avoided by applying the pressure in stages, it having been discovered that cell damage is a function of pressure and temperature. However, seldom is freezing the sole consideration and, accordingly, as will be explained, the best pressure and temperature relationship is guided by several factors.

FIG. 1 illustrates the safe and unsafe division of precompression versus final storage temperature. For example, a precompression pressure of 5,000 p.s.i. yields a final safe storage temperature (assuming negligible dilation of the containing vessel) of −12° C. or higher. A precompression of 3,000 p.s.i. on the other hand, would require a storage temperature of approximately −3.5° C. or higher. Below these temperatures hemolysis due to shell freezing is too severe to give good transfusable results.

While theoretically the lowest possible safe storage temperature on the graph would appear to achieve the best possible reduced metabolic rate, at any given temperature there is a limit to the amount of pressure that blood can be subjected to. Membrane distortion is also a function of pressure and, accordingly, within the safe area shown in FIG. 1, there are varying percentages of cells which hemolyze, and, hence, for each precompression value the lowest possible "safe" temperature is not necessarily the best. I have found a precompression of between 4,000 and 6,000 p.s.i. to give the most satisfactory results, and since the slope of the curve between these pressures is a minimum, this region offers the greatest latitude or selection in storage temperatures.

Figure 2:
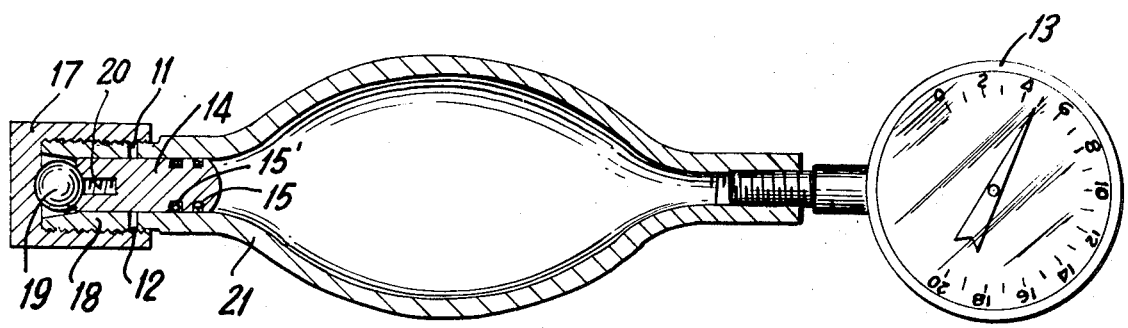

Turning now to FIG. 2, an apparatus for performing the described inventive method as well as an exemplary blood preservation process will now be described.

The vessel in which the blood will be stored must be made of a material of high yield point sufficient to withstand internal pressures of the order of 20,000 p.s.i. It must also have a Young's modulus of elasticity sufficiently high so that in the range of use these internal pressures will produce negligible dilation or radial displacement. The thermal coefficient of expansion, on the other hand, must be such that its effect over the intended temperature range will either increase pressure or will be compensated by the elastic dilation due to pressure. Desirably, the vessel should also be easily adaptable to autoclaving-type sterilization and have its internal surface nonwetting with blood and capable of assuming a mirrorlike finish (for reducing red cell injuries).

The most practical vessel material discovered to date is nickel. Preferably, the vessel is formed by electroforming the nickel upon a mandrel of spherical shape and of blood unit volume. The mandrel is coated with silver or another suitable electrode material and polished to a microfinish. It is then placed into an electrolytic bath where it is agitated or rotated. While one electrode is affixed to the mandrel, the other electrode (the anode) of pure nickel is suspended distally in the bath. Electroplating takes place anode to cathode, depositing nickel ions and slowly building up the vessel to the form shown in the figure. A wall thickness of approximately 0.125 inches has been found sufficient to withstand the internal stresses which will obtain during the described mode (5,900 p.s.i. precompression).

One end of the vessel has a pair of apertures 11 and 12, drilled therethrough for a purpose to be explained, while the other end is threaded internally to take a conventional pressure gauge 13. Slidably received at the end opposite the pressure gauge is a follower piston 14 which is machined to close tolerances and includes a pair of spaced annular slots 15 and 15' for reception of sealing rings.

Figure 2A:
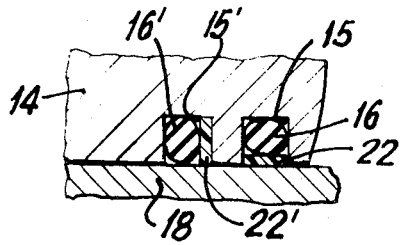

Each sealing ring is, as shown in the detail of FIG. 2a, constituted of two parts. The first comprises a medical grade silicone rubber O-ring 16 of circular cross section which acts as a mechanical bias inside a rectangular cross section O-ring 22 of teflon. This combination, which effectuates the liquid seal, is nonwetting with blood and is easily autoclaved. The second sealing ring 15' serves the fail safe function. It is made up of similar parts (16' and 22') in juxtaposed relationship rather than in tandem in order to reduce sliding friction which has been found to be too stiff where both seals are made like sealing ring 15.

The external surface of the follower piston should have a finish fulfilling the same functional requisites as the inside of the vessel and rings. That is, it must be nonwetting with blood, easily autoclaved, and noninjurious to red cells. A stainless steel piston has proven satisfactory. For purposes of sealing and applying pressure within the vessel a steel cap 17 is threaded to vessel end 18. The pitch of the threads is optional, and the thread depth must be sufficient to withstand the anticipated internal pressures. Considerations governing the thread pitch are the means to be employed for angularly displacing the cap of the vessel during precompression. A pitch of seven threads per inch has been found suitable for use with a torque wrench having a lever arm of 18 inches in length.

Steel ball 19 serves as an antifriction device between the cap 17 and the piston 14. As shown, both the cap and piston include spherical depressions for better ball seating. With this arrangement the piston may be driven rectilinearly with little angular movement upon advancement of the steel cap. In order to permit easy removal of the piston an internal thread 20 may be provided for engagement by an extractor (not shown).

While the pressure gauge 13 shown in the figure will give rather precise indications of precompression and final pressures, such gauges will only be necessary as a spot check and the end of the vessel shown receiving the gauge may be sealed by a pressure limit indicator (e.g., a color-coded piston) or may be eliminated entirely. This may be achieved simply by precisely controlling the internal size of the vessel and thread pitch, and by properly marking the cap and external parts of the vessel so that the relationship of turns to internal pressure may be established for the operator. Thus, for example, a vessel having an internal configuration sufficient to contain a pint of blood and having a three-fourth inch diameter piston will require approximately 1¼ inches of piston travel at 4° C. to apply 4,000 pounds of precompression. The relationship of piston travel to pressure at 4° C. may, therefore, be indexed on the cap and vessel. Needless to say that the distance between the apertures 11 and 12 and the vessel portion 21 where it begins to flare must be sufficient to allow a piston travel equivalent to the greatest precompression pressures desired during the process.

Blood may be collected from the donee either directly into the vessel (which has been sterilized) or indirectly into an enclosed plastic system and then to the vessel. In either case, either the plastic system or the vessel will contain the anticoagulant in sufficient amount. With ACD (trisodium citrate, dextrose, citric acid) as the anticoagulant, the ratio would be 15 ml. of anticoagulant per 100 ml. of blood. With the newer CPD (trisodium citrate, citric acid, monobasic sodium phosphate, dextrose) a new and perhaps preferable anticoagulant, the ratio would be 14 ml. per 100 ml. of blood. In either event, the blood is introduced to the vessel with the piston retrograded to expose the apertures to the interior. The vessel is maintained at approximately 45° to 60° attitude with the apertures vertically located with respect to one another and the blood is introduced into the lower aperture to completely fill the container (which will become apparent when the blood becomes visible at the higher aperture).

The piston is then surfaced on the blood and the cap threaded on the vessel. The temperature of the vessel is then brought as quickly as possible to 4° C. This may be most expeditiously accomplished by means of a constant temperature bath into which the vessel is inserted. As the temperature within the vessel reduces, the blood volume will contract. The piston is free moving in the contraction direction and, accordingly, the piston-blood contact will be maintained. When the temperature of vessel and blood has stabilized at 4° C., the steel cap is then rotated until, for example, 5,900 pounds of positive pressure (precompression) is applied to the blood. This is a precompression of approximately 3.4 percent of the volume. At this temperature and pressure the net increase in the vessel volume was found to be less than one-tenth of 1 percent. This increase reflects the strain introduced by the pressure less the contraction due to reducing the temperature to 4° C.

The prescribed precompression pressure is applied in a controlled manner, preferably at 1,000 p.s.i. or less per minute. The pressure is increased as linearly as possible to avoid pressure transients which would result in membrane rupture upon the inability of the cell to achieve equilibrium. The application of a linear pressure increase may be accomplished by maintaining the displacement of the cap at a substantially constant angular velocity. It has been found that this may be accomplished within suitable limits manually with a torque wrench.

Once the 5,000 p.s.i. has been introduced, the vessel is brought to −13° C. in a controlled bath. The temperature change is again brought about as quickly as possible, but this time with one caveat. The temperature must not change so quickly that the tendency of the blood to increase its volume will result in pressure increases at a rate greater than that which will rupture the membrane (1,000 p.s.i. per minute has been found satisfactory). From the graph it may be seen that a temperature of −14° C. is the minimum safe temperature at the chosen pressure. Thus, −13° C. is sufficiently within the safe portion of the curve and yet is as low as possible to decrease the metabolic rate. The blood is now stored at this temperature for any period from one week to several years.

When the blood is ready for use, the procedure is reversed. The temperature is brought up to 4° C. whereupon the precompression is removed again at a rate preferably about 1,000 p.s.i. per minute. When removed from storage and tested, blood stored according to the inventive process for as long as 6 months yields transfusable results which, when tested by a hematacrit, examined as to osmotic fragility and given all the available tests for determining erythrocyte viability, give results substantially the same as blood stored employing conventional techniques at 4° C. for several days. Thus far, tests in excess of 6 months have not been attempted, however, normal principles of extrapolation make it reasonable to suggest that several years storage will also yield transfusable blood.

While the principles of the invention have been described in connection with the specific apparatus and a specific biological substance, it is to be clearly understood that this description is made only by way of example and not as a limitation to the scope of the invention as set forth in the objects thereof and in the accompanying claims. For example, those skilled in the art will immediately recognize from the foregoing disclosure that many biological substances have either great water content or include as a primary constituent a fluid having a freezing point above or close to the desired storage temperature. In such cases, the inventive method with variations in FIGS. 1 and 2 dependent upon the substance (and any fluid added as a preservative) will be particularly applicable.

I claim:

1. A method of storing whole blood comprising the steps of:
    precompressing said blood to a pressure effectively above atmospheric at a rate sufficiently low to avoid damaging pressure transients and at a temperature above the freezing point thereof, said pressure being dependent upon a predetermined lower temperature to be attained during the method, and being above that which would permit freezing of said blood during the method;
    reducing the temperature of said blood to the storage temperature while maintaining its volume substantially constant, said storage temperature being above that which would permit freezing of said blood at the storage pressure and at or below normal freezing of said flood at atmospheric pressure; and
    storing said blood at said storage temperature and pressure.

2. The method of storing blood claimed in claim 1, comprising the further steps of precompressing said blood in stages subsequent to said initial precompression step at decreasing predetermined temperatures, the last predetermined temperature being the storage temperature.

3. The method of storing blood claimed in claim 1, wherein said predetermined temperature is the storage temperature.

4. The method of storing blood claimed in claim 1, wherein the precompression pressure ranges up to 12,000 p.s.i., and wherein said final storage temperature is between 0° and −21° C.

5. The method of storing blood as claimed in claim 1, wherein the pressure and storing temperature are determined in accordance with the curve of FIG. 1 and the area to the left thereof.

6. A method of storing blood comprising the steps of:
    introducing said blood into a sterile vessel, said vessel having the ability to withstand a selected internal pressure of up to 35,000 p.s.i., and temperature variations from 4° to −21° C. with substantially no change in volume;

precompressing the blood in said vessel to a pressure effectively above atmospheric and not exceeding 12,000 p.s.i. at a rate sufficiently low to avoid damaging pressure transients and at a temperature above the freezing point thereof reducing the temperature of said vessel and the blood therein to a storage temperature of between 0° and −21° C. selected to minimize red cell hemolysis at the storage pressure; and storing said blood at said storage temperature and pressure.

7. The method claimed in claim 6, wherein said precompression pressure is between 4,000 and 6,000 p.s.i., said pressure is applied in one step at a temperature above 0° C., and wherein said storage temperature is between −6° and −14° C.

8. A method of storing whole blood comprising the steps of:

precompressing said blood at a temperature above the freezing point thereof to a pressure between 15 and 12,000 p.s.i. dependent upon a predetermined lower temperature to be attained during the method, said pressure being effectively above atmospheric and not exceeding 12,000 p.s.i. and being applied at a rate sufficiently low to avoid damaging pressure transients;

reducing the temperature of said blood to the storage temperature while maintaining the volume substantially constant, said storage temperature being above that which would permit freezing of said blood at the storage pressure and at or below normal freezing of said blood at atmospheric pressure; and storing said blood at said storage temperature and pressure.